Patented Oct. 3, 1939

2,174,513

UNITED STATES PATENT OFFICE 2,174,513

CHLOROBENZOTRIFLUORIDES

Lee Cone Holt, Edgemoor, and Herbert Wilkens Daudt, Wilmington, Del., assignors to E. I. du Pont de Nemours & Company, Wilmington, Del., a corporation of Delaware No Drawing. Application October 15, 1936, Serial No. 105,752

2 Claims. (Cl. 260—650)

This invention relates to carbon compounds and more particularly to chlorine derivatives of benzo-tri-fluoride. It especially appertains to the process of chlorinating benzo-tri-fluoride and the poly-chloro-benzo-tri-fluorides obtained thereby.

This invention had for an object the preparation of new compounds and compositions of matter having superior dielectric properties. Further objects were the preparation of such substances from benzo-tri-fluoride, the preparation of a new series of chemical compounds containing the benzo-tri-fluoride nucleus, the preparation of such compounds in a very desirable physical state and in a high degree of purity, and the preparation of such materials by easy, safe, simple, inexpensive, and economical methods. Still further objects were to devise new chemical and/or physical processes. A general advance in the art and other objects which will appear hereinafter are also contemplated.

The foregoing objects and related ends are accomplished in the manner set out in the following description which includes details of what is believed to be the best mode for carrying out the invention.

A preferred method for accomplishing the aforementioned objects comprises chlorinating benzo-tri-fluoride.

The invention will be further understood by consideration of the following detailed description and illustrative specific examples in which the quantities, unless otherwise indicated, are given in parts by weight.

Example I

Four hundred fifty (450) parts of benzo-tri-fluoride, 2 parts of anhydrous ferric chloride and 20 parts of iron borings were placed in a glass flask and chlorine gas added to the reaction mass during a period of twelve hours. During this period the temperature was gradually increased from 20° C. to 160° C., and the reaction was continued until an increase in weight of 318 parts was obtained.

The cooled reaction mass was drowned in water and the water-insoluble material extracted with dilute aqueous hydrochloric acid. Subsequently, it was washed with water and dilute sodium hydroxide solution. The separation of the product was assisted by extraction with ether. This product was dissolved in ether and the solution again washed with dilute sodium hydroxide solution. The extracted ether solution was dehydrated, after which the solvent was evaporated. The residue was subjected to fractional distillation. A number of fractions of various chlorinated products were obtained. One of these fractions boiled within the range 240°–250° C. Its chlorine content was 50.5% and it consisted essentially of tetrachlorobenzotrifluoride (theoretical chlorine content 50.0%). This product was further purified prior to making the tests described hereinafter.

This example is copied from our copending application, Serial Number 699,636, filed November 24, 1933.

Example II

One part of anhydrous ferric chloride and ten parts of iron filings were added to 219 parts of benzo-tri-fluoride. Chlorine was passed gradually into the mixture until the total weight of the charge was 295 parts. The temperature was maintained within the range 25° C.–75° C. during the chlorine addition, which took place over a period of approximately twelve hours. The chlorinated product, which was a liquid, was washed successively with dilute hydrochloric acid, water, sodium hydroxide solution, and water. It was dried and thereafter fractionally distilled under atmospheric pressure conditions. Two major fractions, both of which were water white liquids, were obtained. The lower boiling fraction boiled at 137.6°–138° C. It was a mono-chloro-benzo-tri-fluoride (probably 3-chloro). The other fraction which boiled at 178° C.–180° C. was essentially a di-chloro-benzo-tri-fluoride.

Example III

Chlorine was passed into a mixture consisting of one part of anhydrous ferric chloride, ten parts of iron filings, and 225 parts of benzo-tri-fluoride over a period of twenty hours. An increase in weight of 159 parts resulted. The reaction was carried out in glass apparatus embodying a reflux condenser. The starting temperature was 20° C.; and the temperature was then gradually increased (during the reaction) to 160° C. The reaction mass was cooled and drowned in an excess of dilute hydrochloric acid. The water insoluble chlorinated product was mechanically separated from the acid solution and washed successively with water and a dilute solution of sodium hydroxide. The benzo-tri-fluoride derivative was extracted with ether and the ether removed by evaporation. The resulting liquid was fractionally distilled under diminished pressure. Distinct major fractions were obtained. These major fractions were further purified by fractional distillation under atmospheric pressure.

The largest fraction consisted of tetra-chloro-benzo-tri-fluoride boiling at 247°–249° C. It had a chlorine content of approximately 50%. A large fraction of dichloro-benzo-tri-fluoride boiling at 178°–180° C. was also obtained. The remainder of the product comprised smaller quantities of an intermediate fraction and a higher boiling fraction presumably containing tri-chloro-benzo-tri-fluoride and penta-chloro-benzo-tri-fluoride respectively.

*Example IV*

Anhydrous ferric chloride (four parts) and iron filings (forty parts) were added to benzo-tri-fluoride (nine hundred parts) contained in an iron vessel fitted with an agitator and a water cooled reflux condenser. Chlorine was added to the mixture during a period of 18 hours. The reaction mass was maintained at or near the boiling temperature during a portion of this time. The chlorine caused an increase in weight to 1550 parts. Because of the viscous nature of the benzo-tri-fluoride derivative obtained, it was diluted with diethyl ether to facilitate separation from the aqueous substances used for washing. The iron present in the reaction mass was removed by treatment with hydrochloric acid. The resulting fluid chlorinated benzo-tri-fluoride solution was given a wash with water to remove most of the acid. A final wash with sodium carbonate solution was employed to eliminate the remaining traces of the acid. After the final washing, the ether was evaporated and the product subjected to distillation. The major portion of the resulting material boiled in the range 201–240° C. at 760 mm. pressure. It contained approximately 44% (44.05) chlorine and had a specific gravity of approximately 1.63 (1.629). It froze at −41° C. Since this product boiled above 200° C. it was obviously a mixture of poly-chloro-benzo-tri-fluorides. The low congealing temperature of this mixture makes it especially desirable for low temperature uses.

The invention is not limited to the use of iron chloride as a catalyst. Satisfactory chlorination can be obtained with other ring chlorinating catalysts, a variety of which are known to organic chemists. Specific mention may be made of such substances as iodine.

The reaction may be carried out in various types of vessels. These vessels may be constructed of materials ordinarily used in the formation of ring chlorinated compounds. Iron and ceramic (or ceramic lined) vessels are especially suitable.

The times and temperatures of the chlorination are dependent to a certain extent on the operating conditions desired by the person carrying out the process. These factors are influenced to some extent by the use of such expedients as super- or sub-atmospheric pressures, particular catalyts and the like. Pressures above atmospheric favor greater chlorine efficiency. Higher temperatures favor the production of compounds having greater chlorine content. However, it is preferable to use temperatures not greatly in excess of the normal boiling point of the product being prepared. Temperatures high enough to cause decomposition of the beginning or end products would obviously be undesirable from an economic standpoint.

Various mineral acids may be substituted for hydrochloric acid in removing the catalyst from the reaction products. Various water soluble basic substances may be used to completely eliminate the washing acid as will be clear to those skilled in the art.

The products of this invention have valuable dielectric properties and may be used as pure compounds or as mixtures thereof. They may also be used in connection with other materials particularly those having such properties as high dielectric constant, high stability, and low inflammability. The use of mixtures allows utilization of solutions of solid substances such as solid derivatives of benzo-tri-fluoride and diphenyl. The products of this invention may also be advantageously mixed with the chlorine containing derivatives of benzene, naphthalene, and diphenyl. These products readily dissolve in or mix with many organic substances such as those mentioned above and high boiling petroleum distillates. These materials also have valuable applications as modifiers and diluents particularly for reducing the flash and burning points of various substances.

The products described herein are not readily decomposed by common hydrolytic agents. They are extremely stable, showing no tendency to polymerize.

As many apparently widely different embodiments of this invention may be made without departing from the spirit and scope thereof, it is to be understood that we do not limit ourselves to the specific embodiments thereof except as defined in the appended claims.

We claim:
1. Di-chloro-benzo-tri-fluoride.
2. A mixture of chloro-benzo-tri-fluorides boiling below 200° C., said mixture comprising a major fraction of di-chloro-benzo-tri-fluoride.

LEE CONE HOLT.
HERBERT WILKENS DAUDT.